Sept. 18, 1934.  M. GOLDENBERG  1,973,951
SHOE CLEAT ATTACHMENT
Filed Dec. 7, 1931
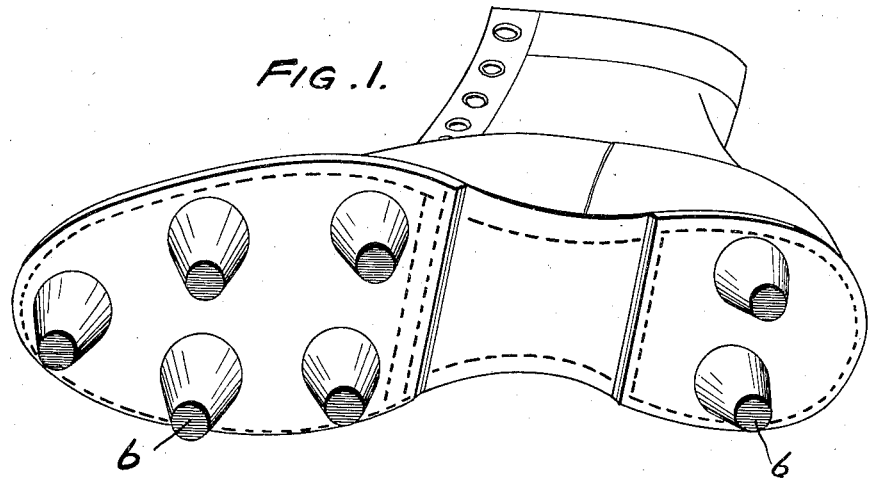
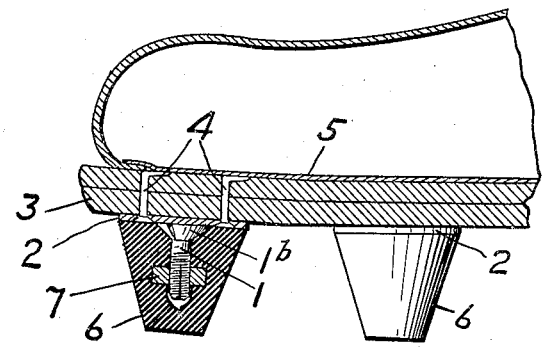
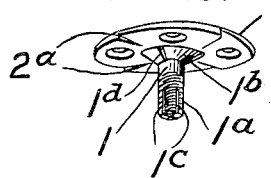 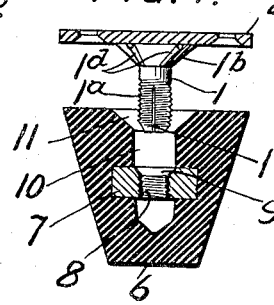 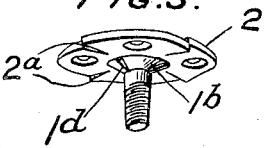
INVENTOR
Michael Goldenberg
BY
ATTORNEY.
WITNESS:

Patented Sept. 18, 1934

1,973,951

UNITED STATES PATENT OFFICE

1,973,951
SHOE CLEAT ATTACHMENT
Michael Goldenberg, Philadelphia, Pa.

Application December 7, 1931, Serial No. 579,578

5 Claims. (Cl. 36—67.5)

My invention is designed to provide improved means for attaching cleats to football or sport shoes so as to minimize the possibility of the cleat becoming loosened in use, while providing a cleat holder having a base preventing the cleat from transmitting pressure of a sharp edge through the sole to the foot and a stem of relatively small diameter strengthened by a conoidal base, thereby permitting the use of a cleat body of normal diameter while providing a cross section of solid material adequate to resist breakage.

In its preferred form, my invention comprises an apertured head or disk, adapted to be nailed to the sole of a shoe, and having integrally formed therewith a stem or threaded shank having a tapered or conoidal base at its juncture with the head. The base is preferably grooved or slotted radially and pressed or bent so as to provide radially extending teeth or serrations. The conoidal base of the shank may also be serrated, and the threaded portion of the shank, or a portion thereof, is preferably slotted or kerfed, and the diameter of the threaded portion of the shank is preferably substantially less than one-third the diameter of the disk or head, so as to provide broad bearing surfaces between the end of the cleat and the abutting face of the cleat holder.

The cleat is preferably molded with a square or polygonal nut embedded therein containing a threaded aperture with a tapered mouth axially coincident with a socket terminating in a recess conforming with the conical base of the stem. When the cleat is applied to the holder, the mouth of the nut engages the split end of the threaded stem, which may be slightly compressed by the nut as the cleat is tightened on the holder. The broad base of the cleat is engaged by the serrations or teeth of the cleat-holder, and such engagement, together with the expansion of the split end of the stem, tends to hold the cleat firmly against accidental unscrewing.

The characteristic features and advantages of my invention will further appear from the following description and the accompanying drawing of a preferred embodiment thereof.

In the drawing, Fig. 1 is a perspective view of a shoe having my improved cleat and cleat holder applied thereto; Fig. 2 is an enlarged longitudinal sectional view through the toe of the shoe shown in Fig. 1; Fig. 3 is a perspective view of a preferred form of cleat holder; Fig. 4 is an enlarged transverse sectional view through a cleat and the cleat holder shown in Fig. 4; and Fig. 5 is a perspective view of a slightly modified form of cleat holder.

In accordance with my invention, as illustrated in the drawing, an externally threaded metallic stud or bolt 1 has formed integrally thereon a radial flange or flat head 2 for attachment to the outer surface of a sole 3 by nails or rivets 4 respectively passing through apertures adjacent to the periphery of the disk. The inner ends of the rivets passing through the outer sole are upset to prevent withdrawal of the rivets and may be covered by an inner sole 5. The stud 1 consists of a shank 1a and a conoidal base 1b merging into the head 2, and the outer end of the shank may be split by a kerf or slot 1c, as shown in Figs. 2, 3 and 4 or tapered as in Fig. 5.

The head or base 2 is cut radially in a diagonal direction to provide a series of teeth or serrations 2a, and the portions of the base on opposite sides of each slot may be of different thicknesses as shown in Fig. 3 or bent into different planes as shown in Fig. 5, so as to augment the projection of the tooth-like edges. If desired the gripping action may be supplemented by serrating the surface of the conoidal base 1b by ridges 1d.

A cleat 6, preferably having the form of a cone frustum, has moulded therein a square nut 7, containing a threaded bore 8 provided with a flaring mouth 9. The bore 8 is coaxial with the cleat passage 10 for receiving the shank 1a and with the tapered recess 11 for housing the tapered base 1b.

When the cleat is drawn up tightly on the fastener, the serrations or teeth, together with the tendency to expansion of the end of the shank projecting through the nut, provide locking means preventing loosening of the cleat during use. The conoidal base of the stem or shank provides a maximum of strength and rigidity at the point where the fastener is subjected to the greatest stress and makes it practical to decrease the diameter of the stem. This permits the provision of a broader bearing surface for the cleat and, in conjunction with the disk, prevents the transmission of pressure of sharp edges through the sole of the foot of the wearer. The reduction of the diameter of the stem further reduces weight of the cleat holder, and prevents breakage at the smaller end of the cleat such as occcurs when there is only a thin web of cleat material surrounding the outer portion of a stem of large diameter.

Having described my invention, I claim:

1. In combination, a one-piece shoe cleat attachment including an externally threaded stud and a plate normal to the stud at the inner end thereof, having an outer cleat-engaging face, and a cleat including a body having an inner end surface for engagement with said first surface, and a nut for the stud embedded in the cleat against turning relative thereto, one of said surfaces being formed for locking engagement with the other preventing turning of said nut on said stud.

2. A shoe cleat attachment comprising an externally threaded stud having a slotted end for passage through and beyond a nut of the cleat and having an integral flange adapted for attachment to the exterior surface of a sole.

3. A shoe cleat attachment comprising an externally threaded stud having a conoidal base and an integral flange into which said base merges, said flange and base having thereon serrations tending to prevent the unscrewing of said cleat on said stud.

4. A shoe cleat attachment comprising an externally threaded stud having a slotted end and a tapered base, and an integral flange into which said base merges, said flange and base being provided with serrations tending to prevent unscrewing of a cleat on said stud.

5. A shoe cleat attachment comprising a one-piece element including a plate having a cleat-engaging side, a cone having its larger end next to said side inwardly from the plate edges, and a screw-threaded stud projecting co-axially from the smaller end of the cone, the plate having means between said cone and said edges for securing the attachment to a shoe and to be covered by the cleat.

MICHAEL GOLDENBERG.